OR 3,798,618

United Sta

Oshida

[11] 3,798,618

[45] Mar. 19, 1974

[54] HOLOGRAPHY MEMORY APPARATUS USING A SINGLE QUARTER-WAVE SPACIAL MODULATOR

[75] Inventor: Yoshitada Oshida, Tokyo, Japan

[73] Assignee: Hitachi Ltd., Tokyo, Japan

[22] Filed: July 28, 1972

[21] Appl. No.: 276,172

[30] Foreign Application Priority Data

July 28, 1971 Japan .............................. 46-55969

[52] U.S. Cl. ........ 340/173 LM, 340/173.2, 350/3.5, 350/150

[51] Int. Cl. ....................... G11c 13/04, G11c 11/22

[58] Field of Search... 340/173 R, 173 LT, 173 LM, 340/173.2; 350/3.5, 150

[56] References Cited

UNITED STATES PATENTS

| | | | |
|---|---|---|---|
| 3,614,200 | 10/1971 | Taylor | 340/173 LM |
| 3,239,671 | 3/1966 | Buhrer | 250/199 |
| 3,407,017 | 10/1968 | Fleisher | 350/150 |
| 3,701,122 | 10/1972 | Geusic | 340/173.2 |

OTHER PUBLICATIONS

Vitals, Hologram Memory for Storing Digital Data, IBM Technical Disclosure Bulletin, Vol. 8, No. 11, 4/66, pp. 1581–1583

Hodges, Computer Memories, IEEE Student Journal, Vol. 8, No. 4, 9/70, pp. 15–20

*Primary Examiner*—Bernard Konick
*Assistant Examiner*—Stuart Hecker
*Attorney, Agent, or Firm*—Craig and Antonelli

[57] ABSTRACT

A holography memory apparatus has an object light beam converted into circularly polarized light by a quarter-wave plate. The circularly polarized light beam is caused to impinge upon a digital spacial modulator employing a quarter-wave plate, so as to modulate the polarized direction of the incident light, in response to information to be recorded. A hologram is recorded on a hologram plate resulting from the interference between the modulated object light beam and a reference light beam.

11 Claims, 7 Drawing Figures

HOLOGRAPHY MEMORY APPARATUS USING A SINGLE QUARTER-WAVE SPACIAL MODULATOR

BACKGROUND OF THE INVENTION

The present invention relates to holography memory apparatus and, more particularly, to improvements in a digital spacial modulator used in holography memory apparatus.

DESCRIPTION OF THE PRIOR ART

Prior art digital spacial modulators employ two quarter-wave plates made of irregular ferroelectric crystals, or a single half-wave plate.

As will be described hereinafter, the former is disadvantageous in that the optical system is very complicated. As compared with the former, the latter is disadvantageous in that the driving voltage ( pulse amplitude ) is high, while the memory capacity is small, and that the exposing time for making a hologram is long.

SUMMARY OF THE INVENTION

An object of the present invention is to provide a holography memory apparatus which is equipped with a digital spacial modulator capable of simplifying the optical system thereof.

Another object of the present invention is to provide a holography memory apparatus which is equipped with a digital spacial modulator of large memory capacity and low driving voltage.

Still another object of the present invention is to provide a holography memory apparatus which is equipped with a digital spacial modulator employing a quarter-wave plate, being simple in construction and enabling the shortening of the exposure time.

In order to accomplish the above-mentioned various objects, the present invention is characterized by polarizing means which polarizes a coherent light beam ( object light beam ) so as to have a desired polarity condition, and a digital spacial modulator which modulates the polarized direction of the polarized object light beam in response to information to-be-recorded.

Figure 1:
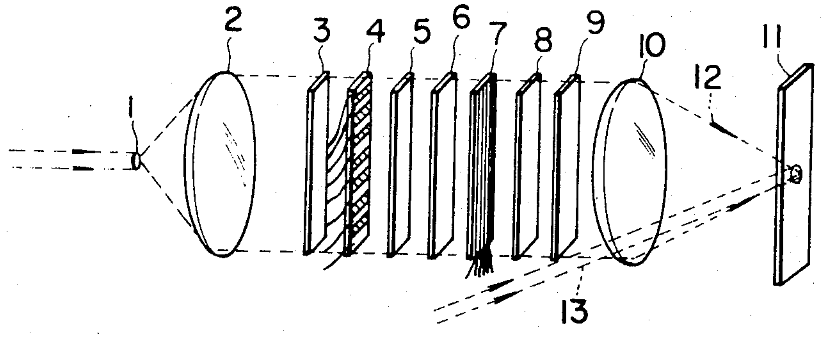
FIG. 1 PRIOR ART
FIGS. 1 and 2 are views each showing a prior-art holography memory apparatus.

DESCRIPTION OF THE PREFERRED EMBODIMENTS:

Shown in FIG. 1 is a prior-art spacial modulator using quarter-wave plates ( each being a crystal plate which is made of an irregular ferroelectric substance and which has such a thickness that the difference of birefringent light rays corresponds to a quarter wavelength ) . Referring to FIG. 1, numerals 1 and 2 designate lenses, which magnify an object light beam from a suitable coherent light source ( although not shown, it may be a laser light source by way of example ) . A polarizer 3 polarizes the incident object light beam into linearly polarized light. Numeral 4 indicates a quarter-wave plate capable of electrically inverting the crystal orientation, on the front surface of which parts are provided with elongated transparent electrodes and insulating parts are alternately arranged in the lateral direction, and on the rear surface of which a transparent electrode is provided over the entire area. Numeral 5 indicates a quarter-wave plate, and 6 a polarizer. The polarizing directions of the polarizers 3 and 6 are made uniform, while the crystal orientations of the quarter-wave plates 4 and 5 are made the same and are inclined by 45° with respect to the polarizing directions of both the polarizers 3 and 6. Then, in response to the sign of a voltage applied to desired electrodes on both the surfaces of the quarter-wave plate 4 and corresponding to each other, light transmitted through the polarizer 6 has slit-shaped bright and dark portions in the lateral direction in correspondence with the electrodes. Shown at 7 is a quarter-wave plate which has the same structure as the quarter-wave plate 4, and which is so arranged as to define an angle of 90° with respect thereto. Numeral 8 represents a quarter-wave plate, and 9 a polarizer. The polarizer 9 is arranged in the same polarizing direction as those of the polarizers 3 and 6. In response to the sign of a voltage applied to electrodes of the quarter-wave plate 7, light transmitted through the quarter-wave plates 7 and 8 and the polarizer 9 has slit-shaped bright and dark portions in the longitudinal direction in correspondence with the electrodes.

The elongated transparent electrodes provided on the respective surfaces of the quarter-wave plates 4 and 7 are arranged so as to be orthogonal to one another, and voltage pulses corresponding to information to be recorded are simultaneously applied to the electrodes corresponding to each other. That is, one bit of information can be written by the two intersecting electrodes. The light transmitted from the polarizer 9 can, accordingly, be formed so as to have bright and dark portions which correspond to the two-dimensional bit information applied to the transparent electrodes on the surfaces of the quarter-wave plates 4 and 7. The two-dimensional information light thus formed is focused by a lens 10. The focused light 12 is illuminated on a hologram plate 11, and forms interference fringes jointly with a reference light beam 13 incident on the same position as that of the focused light beam from a desired angle. The interference fringes are recorded on the hologram plate 11.

Figure 2:
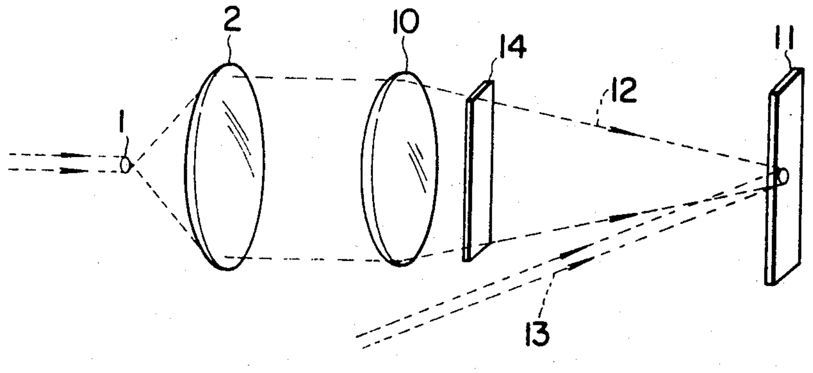
FIG. 2 PRIOR ART

A prior art spacial modulator using a half-wave plate is shown in FIG. 2. Referring to the figure, numerals 1, 2 and 10 designate lenses. An object light beam transmitted through the lens 10 is transmitted through a spacial modulator composed of a half-wave plate 14, and impinges on a hologram plate 11. On the other hand, a reference light beam 13 coherent with the object light beam 12 also impinges on the hologram plate 11. Thus, an interference fringe between both the light beams is recorded as a hologram. In the case where the hologram is made using the apparatus, linearly polarized light is employed with which the crystal orientation of the half-wave plate 14 constituting the spacial modulator and the polarized direction of the incident light beam are identical. The spacial modulator changes the optical path length of the light beam prior to its arrival at the hologram plate, by a half wavelength with respect to the linear polarized light. The interference fringe is recorded on the hologram plate 11 by the phase-modulated object light beam and the reference light beam having the same polarized direction. In accordance with such a method, the object light beam is modulated twice, to effect so-called double exposure, whereby information is recorded into the hologram.

Figure 3:
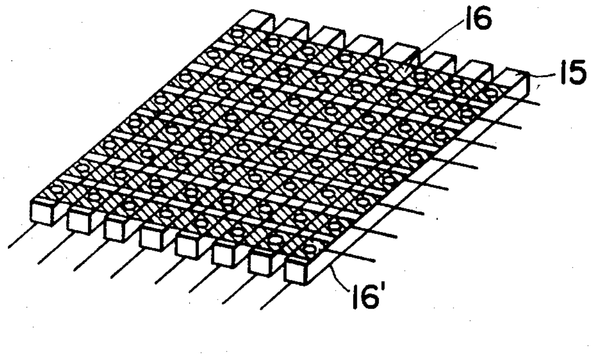
FIG. 3 is a schematic view showing the construction of a digital spacial modulator.

The spacial modulator 14 has a structure as shown, by way of example, in FIG. 3. A plurality of elongated irregular ferroelectric crystals 15 having the spontaneous Pockels effect are combined, and are constructed so as to correspond to a half-wave plate. On the front surfaces of the many crystals arrayed in the longitudinal direction, electrodes 16 in the lateral direction are bridged. On the other hand, transparent electrodes 16' are affixed to the rear surfaces in the longitudinal direction. A voltage +V is applied to the front surface electrode at the first row, while voltages at the other rows are zero. In conformity with information to be entered into the first row, voltages of 0 or −V are simultaneously applied to the longitudinal electrodes on the rear surface. In this way, information at the first row is stored.

Figure 4:
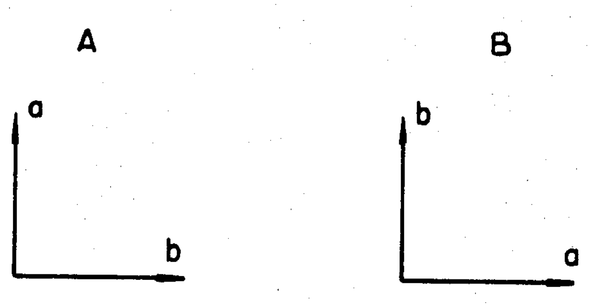
FIG. 4 shows diagrams for explaining the inversion of the crystal state or orientation of the digital spacial modulator in FIG. 3.

Next, a voltage of +V volts is applied to the electrode at the second row, while voltages at the other rows are zero. The voltages of 0 or −V are simultaneously applied in the longitudinal direction. Where a voltage of +2V is applied across the front and rear surfaces, the state of the crystal ( the crystal orientation ) is held in a state A as shown in FIG. 4. On the other hand, where a voltage lower than +V is applied, a state B is held as it is. When it is desired to render "0" a signal at the *m*-th row and *n*-th column of the spacial modulator, the crystal states A and B or those B and A are established at the first and second exposures. When the signal at the *m*-th row and *n*-th column is to be made "1", the crystal states A and A or those B and B are established at the first and second exposures. With the prior-art holography memory apparatus of the system employing the quarter-wave plates, the optical system is complicated, as shown in FIG. 1. On the other hand, with the holography memory apparatus of the system using the half-wave plate and shown in FIG. 2, the crystal should be thick as a half-wave plate is employed. For this reason, the pitch between bits cannot be made sufficiently small, and therewith, the driving voltage necessary to invert the crystal state becomes twice as high as that of the quarter-wave wave plate. Moreover, the system using the half-wave plate employs two-first and second exposures. A period of time $t_l$ for writing information into the spacial modulator occurs between the exposures, so that a period of time $t_{T2}$ required for the whole exposure process becomes longer. Letting $t_H$ be the exposure time for one exposure $t_{T2}$ becomes:

$$t_{T2} = 2\ t_H + t_l$$

In contrast, a period of time $t_{T1}$ required for the whole exposure process in case of the hologram of the single exposure is:

$$t_{T1} = t_H\ ,\ \text{and}$$

$t_H$ becomes small by making the intensity of the light source high, whereas $t_l$ cannot be made smaller than a certain value since the inverting period of time of the crystal is subject to limitations. For example, in the case of employing a spacial modulator in the form of a matrix of 8 rows and 9 columns in which a gadolinium molybdate crystal ( $Gd_2MoO_4$ ) is used as the above-stated crystal and in which the bit spacing is 1mm, the exposure time should unavoidably be made several tens of milliseconds when information is recorded in accordance with the foregoing method. This period of time becomes still longer when the numbers of rows and columns are increased. On the other hand, if the laser light source is made intense , $t_H$ can be easily made shorter than several milliseconds. Accordingly, $t_{T2}$ is one order or more higher than $t_{T1}$ . As the exposure time for making a hologram increases it is more necessary to sufficiently take a countermeasure against vibrations of the hologram making apparatus, especially the spacial modulator.

Figure 5:
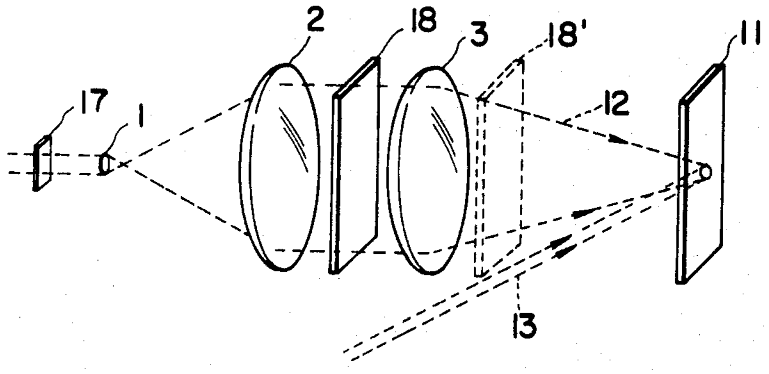
FIG. 5 is a view showing the fundamental construction of the present invention.
Figure 6:
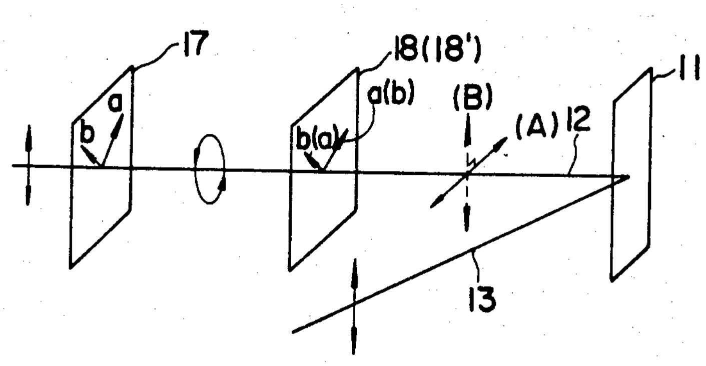
FIG. 6 is a diagram for explaining the operation of the construction in FIG. 5.

For this reason, in accordance with the present invention, a hologram is made through a single exposure by the use of holography apparatus, as shown in FIG. 5, which adopts a spacial modulator composed of a quarter-wave plate. Reference numeral 17 in FIG. 5 designates a quarter-wave plate. As shown in FIG. 6, it is arranged with the crystal orientation inclined by 45° with respect to incident linearly polarized light. A light beam transmitted through the quarter-wave plate 17 is thus converted into circularly polarized light. Numerals 1, 2 and 3 of FIG. 5 indicate lenses, which are so arranged so that light rays may be focused on a hologram plate 11. Shown at 18 is a spacial modulator which is composed of a quarter-wave plate, and whose structure is quite the same as that illustrated in FIG. 3.

In FIG. 5, the spacial modulator may also be arranged at position 18' in place of position 18. In response to an applied voltage the crystal state of each bit of the spacial modulator can hold a state A in which the crystal orientation is identical with that of the quarter-wave plate 17, or state B in which they are not identical. In dependence on the state, light transmitted through the spacial modulator 18 becomes linearly polarized in the vertical direction or linearly polarized in the horizontal direction, as illustrated in FIG. 6. Since a reference light beam 13 is linearly polarized in the vertical direction, it does not form any interference fringe jointly with light transmitted through a bit in the crystal state A. Since, on the other hand, it forms an interference fringe jointly with light transmitted through a bit in the crystal state B, the intended hologram is obtained. Now, take Cartesian coordinates ( x, y ) on the spacial modulator, and Cartesian coordinates $(\xi,\ \eta)$ on the hologram medium. In the case where the spacial modulator is located at 18', the distance between plate (x, y) and plane $(\xi,\ \eta)$ is made $f$. Let $\lambda$ be the wavelength of the light used. Let $\vec{h}$ be a unit vector orthogonal to the optical axis and in the horizontal direction, and $\vec{V}$ be a unit vector in the vertical direction. Let II ( x, y) be the amplitude of light transmitted through the spacial modulator as includes a polarized direction vector. Then, $$\Pi(x,\ y) = \sum_m \sum_n T_o(x - ma,\ y - na) S_g(m,\ n) \quad (1)$$

where $T_o\ (x,y\ ) = 1$ for $x^2 + y^2 \leqq r^2$ and 0 for $x^2 + y^2 > r^2$ , $a$ denotes the spacing of bits on the spacial modulator, $r$ denotes the radius of each bit, and $S_g$ ( m, n ) $= \vec{h}$ when bit ( $m, n$ ) is in the state A and $\vec{V}$ when bit ( $m, n$ ) is in the state B.

The light beam transmitted through the spacial modulator becomes a focused light beam, so that the $\overline{h}$ and $\overline{V}$ components do not become the same values for any ( $m$, $n$ ). Since, however, the difference is small, it is now neglected. Then, the complex amplitude $g_1(\xi, \nu)$ of light diffracted on the hologram plate becomes:

$$g_1(\xi, \eta)=C_o\int\int\sum_m\sum_n T_o(x-ma, y-na)S_g(m, n) \times\exp\left\{i\frac{2\pi(\xi x+\eta y)}{f\lambda}\right\}dxdy \qquad (2)$$

where $C_o$ is a proportionality constant.

Here, the following substitutions are employed:

$$E(\xi, \eta; m, n) \equiv \exp\{i[2\pi(m\xi+n\eta)a]/f\lambda\}$$

$$F(\xi, \eta) \equiv \int\int T_o(x, y)\exp\{i[2\pi(\xi x+\eta y)]/f\lambda\}\,dx\,dy$$

$$S_o(m, n) \equiv {}_g(m, n)\cdot\overline{h}$$

$$S_1(m, n) \equiv {}_g(m, n)\cdot\overline{V}$$

Then, $$g_1(\xi, \eta)=C_oF(\xi, \eta)\sum_m\sum_n E(\xi, \eta; m, n) \times\{S_o(m, n)\cdot\overline{h}+S_1(m, n)\overline{V}\} \qquad (3)$$

$S_o(m, n)$ is "1" for bits bringing about light polarized in the horizontal direction, and becomes "0" for bits bringing about light polarized in the vertical direction. $S_1(m, n)$ becomes the opposite of $S_o(m, n)$. The complex amplitude $\overline{R}(\xi, \eta)$ of the reference light beam, including the polarized direction on the hologram is: $\overline{R}(\xi, \eta) = \overline{V}\,Cr\exp\{i\,2\pi\xi\sin\theta/\lambda\}$ 4

Accordingly, due to the interference between the object light beam and the reference light beam which are expressed by Equation (3) and Equation (4) respectively, an intensity distribution $I(\xi, \nu)$ represented by the following equation appears on the hologram plate:

$$I(\xi,\eta)=1g_1,(\xi,\eta)+|R(\xi,\eta)|^2$$
$$=I_o(\xi,\eta)+I_1(\xi,\eta)+I_{-1}(\xi,\eta) \quad \ldots\ldots (5)$$

$$I_o(\xi,\eta)=|C_oF(\xi,\eta)|^2\left\{\left|\sum_m\sum_n E(\xi,\eta;m,n)S_o(m,n)\right|^2+\left|\sum_m\sum_n E(\xi,\eta;m,n)S_1(m,n)\right|^2\right\}+|Cr|^2 \quad \ldots\ldots (6)$$

$$I_1(\xi,\eta)=Cr^*C_oF(\xi,\eta)\exp\left\{-i\frac{2\pi\xi\sin\theta}{\lambda}\right\}\sum_m\sum_n E(\xi,\eta;m,n)S_1(m,n) \quad \ldots\ldots (7)$$

$$I_{-1}(\xi,\eta)^*=CrC_o^*F(\xi,\eta)\exp\left\{i\frac{2\pi\xi\sin\theta}{\lambda}\right\}\sum_m\sum_n E(\xi,\eta;m,n)^*S_1(m,n) \quad \ldots\ldots (8)$$

In Equation (5), a term which influences a reconstruction image is $I_1(\xi, \eta)$. The term is quite the same equation as in the case where the $\overline{h}$ component of $\int_g(m,n)$ is previously shielded by a polarizer. In the case of intercepting the h component by the use of the polarizer, however, the only difference is that the first term of Equation (6) representative of the first term $I_o(\xi, \eta)$, of Equation (5) becomes zero. In general when a hologram is formed, the reference light beam is selected to have a greater intensity compared with the object light beam. The influence exerted on the reconstructed image of the hologram on account of the absence of the first term in Equation(6) is only slight. The reconstructed image of a hologram made by the holography apparatus of the present invention can, accordingly, achieve substantially the same picture quality as that of the reconstructed image of a hologram made using a light shielding plate which transmits light only at the bits of $S_1(m, n) = 1$.

Figure 7:
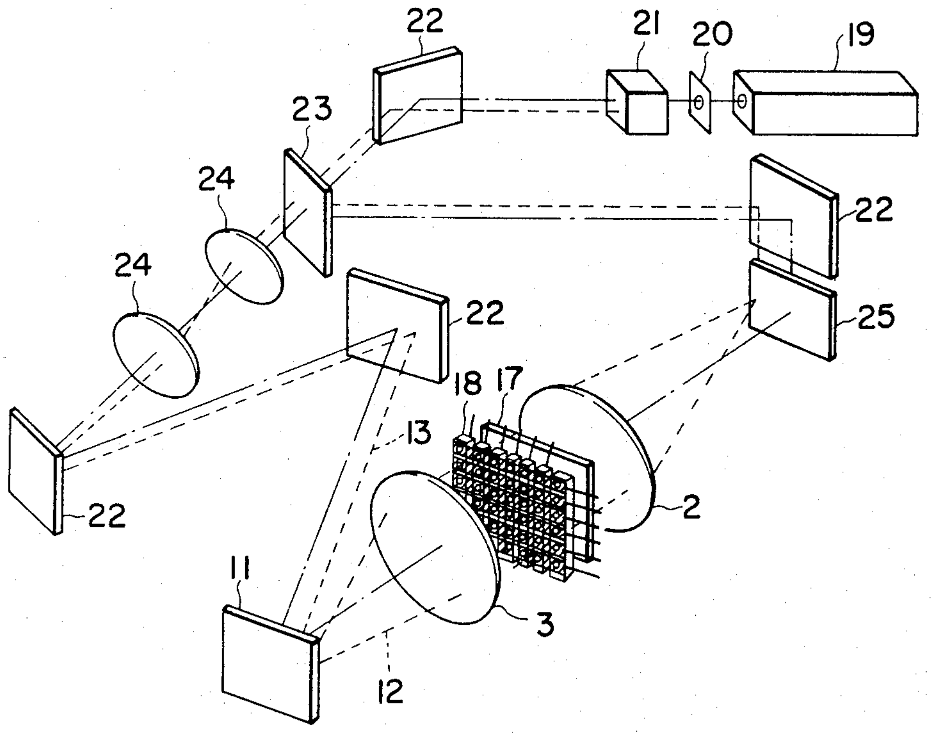
FIG. 7 is a schematic view showing an embodiment of the present invention.

The present invention will be described hereunder in connection with one embodiment. FIG. 7 is a diagram showing a laser holography memory according to the present invention. Referring to the figure, light emerging from a laser light source 19 is linearly polarized light which consists only of a polarizing component in the vertical direction. Numeral 20 designates an optical shutter, while 21 is an optical deflector. A coherent light beam having had its optical path determined by the optical deflector 21 is split into an object light beam and a reference light beam by a beam splitter 23. The object light beam impinges on an illumination hologram 25. The first-order diffraction light of the object light beam becomes a magnified beam for illumination. It is transmitted through a lens 2 to become parallel rays. The parallel rays impinge on a quarter-wave plate 17. The linearly polarized light is converted into circularly polarized light by the quarter-wave plate 17. The circularly polarized light impinges on a spacial modulator composed of a quarter-wave plate 18. While, in the illustrated embodiment, the quarter-wave plate of gadolinium molybdate is used for the spaciol modulator, it may be composed of any quarter-wave plate capable of electrically inverting the crystal orientation. For example, the PLZT (lead-lanthanum-zirconate-titanate-ceramic) crystal may be employed. Bits of the spacial modulator 18 as are arrayed in the form of a matrix are electrically driven, to be brought into crystal states conforming to desired input information. Light transmitted through each bit is brought into a polarized state in the horizontal direction or in the vertical direction, and is focused on a small part on a hologram plate 11 by means of a lens 3. On the other hand, the reference light beam split by the beam splitter 23 passes through an optical-path inverting system (composed of lenses 24), and is illuminated on the hologram plate 11 by means of reflector 22. The object light beam 12 and the reference light beam 13 are caused to interfere within the hologram plate, to thereby record the information. The quarter-wave plate 17 and the spacial modulator 18 are not restricted in their set places, insofar as they are located within the path of the illumination beam. When, however, the signal-to-noise ratio of a reconstructed hologram image is taken into consideration, it is preferable to cause light to impinge at an angle nearly normal to the quarter-wave plate crystal. To arrange the quarter-wave plate 17 and the spacial modulator 18 at positions illustrated in FIG. 7 is, accordingly advantageous from the view point of decreasing the noise of the reconstructed image. In the case where the quarter-wave plate is arranged, as shown in FIG. 7, in the illumination beam magnified by the lens, it is not necessary to employ a single quarter-wave plate having the size of the cross section of the beam. For example, in the case of using the spacial modulator as shown in FIG. 7, the quarter-wave plate may be arranged only at a portion of the light incident on a circular transparent part through which the light is transmitted. Accordingly, it is also possible to assemble the quarter-wave plate 17 into the spacial modulator in such a way that a number of small quarter-wave plates are arrayed on the front surface side or the rear surface side of the circular transparent part.

As has thus far been described, in accordance with the present invention, it is possible to constitute a spacial modulator of a quarter-wave plate without using a half-wave plate in the prior art, and the thickness of an irregular ferroelectric crystal plate employed therefor is reduced to half. In consequence, the following technical results are attained:

1. The voltage applied to the spacial modulator may be 1/2 of that of the prior art, and the breakdown voltage of elements of the driving circuit of the spacial modulator can be reduced to half.
2. The limit of the pitch of bits of the spacial modulator becomes ½ of that of the prior art, the limit value of the bit density, is therefore, increased to be 4 times higher and it is thus possible to manufacture a spacial modulator of high bit density. Moreover, in the system which uses the prior-art phase modulation type spacial modulator employing the half-wave plate, since the double exposure is conducted when a hologram is made, reduction of the period of time required for the whole exposure process is subject to restrictions. In contrast, in the system of the present invention, a reduction in the exposure time can be easily realized by increasing the intensity of the light source. Thus, in comparison with the prior-art system,
3. it is possible to manufacture a holography memory apparatus which does not require a perfect countermeasure against vibrations.

I claim:

1. A holography memory apparatus comprising:
coherent light beam source means for providing an object light beam and a reference light beam;
polarizing means for polarizing the object light beam so as to have a desired polarity condition;
digital spacial modulator means consisting of a single digital spacial modulator for modulating the direction of polarization of the polarized object light beam in response to information to be recorded;
a recording medium; and
optical means for illuminating the reference light beam and the modulated object light beam at the same position on the recording medium, so as to record a hologram pattern due to the interference between said reference and object light beams.

2. A holography memory apparatus according to Claim 1, wherein said polarizing means includes a quarter-wave plate made of an irregular ferroelectric crystal which is so arranged that the angle defined between its crystal orientation and the polarized direction of the object light beam incident thereon is 45', and wherein said digital spacial modulator comprises a quarter-wave plate array made of irregular ferroelectric crystals, a plurality of lateral electrodes disposed on the front surface of the quarter-wave plate array, and a plurality of longitudinal electrodes disposed on the rear surface thereof, said lateral and longitudinal electrodes being arranged so as to form a matrix.

3. A holography memory apparatus comprising:
first means for providing a first beam of coherent energy;
second means for providing a second beam of coherent energy;
third means, disposed in the path of said first beam, for imparting a predetermined type of polarization to said first beam;
fourth means, consisting of a single digital spacial modulator, disposed in the path of the energy exiting said third means, for modulating the direction of polarization of said polarized first beam in accordance with prescribed information to be recorded;
a recording medium; and
fifth means, disposed to receive said second beam and the modulated polarized first beam, for directing each of said received beams at the same position on said recording medium, whereby a hologram pattern resulting from the interference between said modulated first beam and said second beam will be recorded.

4. A holography memory apparatus according to claim 3, wherein each of said energy beams is coherent light, said third means comprises means for circularly polarizing said first beam of light, and said digital spacial modulator comprises means for selectively converting at least one prescribed portion of said circularly polarized first beam into linearly polarized light in accordance with said prescribed information.

5. A holography memory apparatus according to claim 4, further including means for directing said first beam of light onto an illumination hologram prior to directing said first beam of light onto said digital spacial modulator.

6. A holography memory apparatus according to claim 3, wherein said third means includes a quarter wave plate made of an irregular ferroelectric crystal being disposed in the path of said first beam so that the angle defined between its crystal orientation and the direction of polarization of said first beam incident thereon is 45° ) , and wherein said digital spacial modulator comprises a quarter-wave plate array of irregular ferroelectric crystals having a plurality of first electrodes disposed on one surface of said array and a plurality of second electrodes disposed on a second surface of said array opposite said first surface and being arranged substantially orthogonally with respect to said first electrodes.

7. A holography memory apparatus according to claim 6, further including means for directing said first beam of light onto an illumination hologram prior to directing said first beam of light onto said digital spacial modulator.

8. A holography memory apparatus according to claim 7, further including means for collimating said first beam of light prior to its passage through said third means and digital spacial modulator.

9. A holography memory apparatus according to claim 7, further including means for scanning each of said first and second beams of light prior totheir incidence upon said third means, said digital spacial modulator and said fifth means.

10. A holography memory apparatus according to claim 9, further comprising a laser for generating each of said first and second beams of light and a controllable optical deflector for effecting the scanning of said beams.

11. A holography memory apparatus according to Claim 10, further including means for collimating said first beam of light prior to its passage through said third means and said digital spacial modulator.

* * * * *